UNITED STATES PATENT OFFICE.

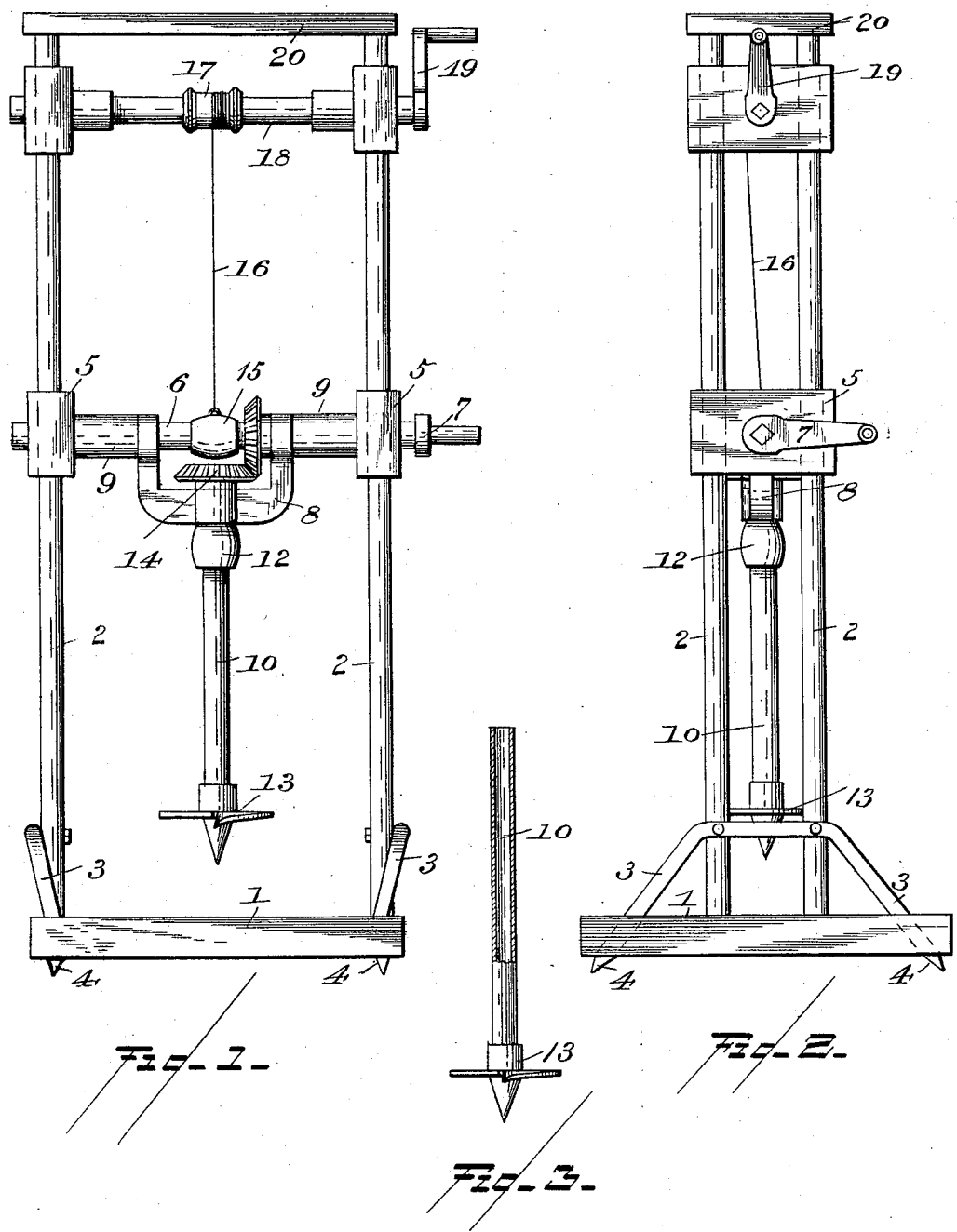

STEPHEN G. DAVIS, OF INDIANOLA, ILLINOIS, ASSIGNOR, BY DIRECT AND MESNE ASSIGNMENTS, OF TWO-THIRDS TO BENJAMIN C. RICHIE, OF GEORGETOWN, ILLINOIS.

POST-HOLE DIGGER.

SPECIFICATION forming part of Letters Patent No. 595,609, dated December 14, 1897.

Application filed March 10, 1897. Serial No. 626,860. (No model.)

*To all whom it may concern:*

Be it known that I, STEPHEN G. DAVIS, a citizen of the United States, and a resident of Indianola, in the county of Vermilion and State of Illinois, have invented certain new and useful Improvements in Post-Hole Diggers; and I do hereby declare that the following is a full, clear, and exact description of the invention, which will enable others skilled in the art to which it appertains to make and use the same, reference being had to the accompanying drawings, which form a part of this specification.

My invention relates to post-hole diggers; and its object is to provide an improved construction of the same whereby I secure important advantages with respect to efficiency in use.

The invention consists in the novel construction and combination of parts hereinafter fully described and claimed.

In the accompanying drawings, Figure 1 is a front elevation of a post-hole digger constructed in accordance with my invention. Fig. 2 is a side view of the same. Fig. 3 is a sectional view of the drill-shaft.

In the said drawings, the reference-numeral 1 designates a base consisting of four beams or bars connected together at the ends, so as to form a rectangular frame. To each of the side bars of this frame are secured two cylindrical rods or shafts 2. Bolted to these rods near the lower ends are horizontal rods 3, which pass through the beams near the ends thereof and form feet 4, which take into the ground and serve to steady and brace the apparatus.

The numerals 5 5 designate two vertically-slidable cross-heads, through which the rods 2 pass and in which is journaled a horizontal rotatable driving-shaft 6, provided with a crank 7. Journaled to this shaft is a yoke 8, separated from the cross-head by washers 9. The numeral 10 designates a hollow vertical drill-shaft, preferably of gas-pipe, which is journaled in said yoke and provided with a collar 12, and at the lower end is provided with an earth-auger 13 of any ordinary or suitable construction. At the upper end the said shaft is provided with a miter-wheel 14, which meshes with a corresponding miter-wheel on the shaft 6. Loosely mounted on said shaft 6 is a thimble 15, to which is secured one end of a cord or rope 16, the other end of which is secured to a spool or drum 17, fixed to a shaft 18, journaled in stationary cross-heads at the upper ends of the rods 2. Said shaft is provided with a crank 19.

The numeral 20 designates a beam to which the upper ends of the rods 2 are secured.

Instead of the cord 16 and spool 17 I may use a sprocket-chain and pulley.

The operation is as follows: The apparatus is placed on the ground at the proper place and the driving-shaft rotated, which will cause the drill-shaft and auger to be rotated and the hole bored. When the proper depth has been reached, the shaft 18 is rotated, which will wind up the rope or cord and elevate the drill-shaft and auger. The said drill-shaft being hollow will allow air to the auger or drill, and thus allow it to be easily raised. When the auger has been elevated, it and the yoke can be swung to one side to dump the earth off the auger, the yoke turning on the shaft to allow for such movement.

Having thus fully described my invention, what I claim is—

In a post-hole digger, the combination with the rectangular frame, the rods secured thereto, the vertically-movable cross-heads, the driving-shaft, the miter-wheel secured thereto, the yoke journaled to said shaft, the drill or auger shaft, the miter-wheel at the upper end thereof, the shaft located above said driving-shaft, the spool or drum, the cord or rope and the loose collar on the driving-shaft, of the horizontal rods bolted to said upright rods having their ends bent downwardly and passed through said frame forming feet therefor, substantially as described.

In testimony that I claim the foregoing as my own I have hereunto affixed my signature in presence of two witnesses.

STEPHEN G. <sup>his</sup> ✕ <sub>mark</sub> DAVIS.

Witnesses:
P. H. SMITH,
C. B. SPANG.